US006880645B2

(12) United States Patent
Izumisawa

(10) Patent No.: US 6,880,645 B2
(45) Date of Patent: Apr. 19, 2005

(54) PNEUMATIC ROTARY TOOL

(75) Inventor: Osamu Izumisawa, Tokyo (JP)

(73) Assignee: S.P. Air Kabusiki Kaisha, Nagano Pref. (JP)

( * ) Notice: Subject to any disclaimer, the term of this patent is extended or adjusted under 35 U.S.C. 154(b) by 15 days.

(21) Appl. No.: 10/171,905

(22) Filed: Jun. 14, 2002

(65) Prior Publication Data

US 2003/0230423 A1 Dec. 18, 2003

(51) Int. Cl.[7] .......................... B25D 15/00; B23B 45/04

(52) U.S. Cl. ...................................... 173/93.5; 173/169

(58) Field of Search ........................ 173/93, 93.5, 93.6, 173/168, 169, 176, 104, 221

(56) References Cited

U.S. PATENT DOCUMENTS

| | | | | |
|---|---|---|---|---|
| 2,331,874 A | | 10/1943 | Van Sittert | |
| 2,569,244 A | * | 9/1951 | Larson | 91/21 |
| 2,581,033 A | * | 1/1952 | Larson et al. | 173/93.6 |
| 3,208,722 A | * | 9/1965 | Rodriguez et al. | 415/122.1 |
| 3,714,994 A | | 2/1973 | Zoerner et al. | |
| 3,951,217 A | * | 4/1976 | Wallace et al. | 173/169 |
| 4,379,492 A | * | 4/1983 | Hiraoka | 173/181 |
| 5,346,024 A | * | 9/1994 | Geiger et al. | 173/221 |
| 5,377,769 A | * | 1/1995 | Hasuo et al. | 173/169 |
| 5,591,070 A | | 1/1997 | Kachich | |
| 5,901,794 A | * | 5/1999 | Schoeps et al. | 173/93.5 |
| 5,918,686 A | * | 7/1999 | Izumisawa | 173/20 |
| 5,992,539 A | * | 11/1999 | Lin | 173/93 |
| 6,039,231 A | * | 3/2000 | White | 227/130 |
| 6,044,917 A | * | 4/2000 | Brunhoelzl | 173/93.5 |
| 6,047,780 A | * | 4/2000 | Lin | 173/168 |
| 6,059,049 A | * | 5/2000 | Lin | 173/93.5 |
| 6,217,306 B1 | * | 4/2001 | Seward et al. | 418/270 |
| 6,250,399 B1 | * | 6/2001 | Giardino | 173/47 |

FOREIGN PATENT DOCUMENTS

| | | |
|---|---|---|
| DE | 33 30 891 | 3/1985 |
| EP | 0 849 052 | 6/1998 |
| EP | 0 876 883 | 11/1998 |
| FR | 2 097 803 | 3/1972 |
| GB | 811 252 | 4/1959 |
| WO | WO 01/54865 | 8/2001 |

* cited by examiner

*Primary Examiner*—Scott A. Smith
*Assistant Examiner*—Paul Durand
(74) *Attorney, Agent, or Firm*—Senniger Powers

(57) ABSTRACT

Generally, a pneumatic rotary tool of the present invention comprises a housing formed of a plastic material and includes a motor receptacle having a front end and an open rear end. An air motor is disposed within the motor receptacle of the housing. An air inlet passage extends to the motor for delivering pressurized air to the motor to power the motor to drive an output shaft. An end plate of the motor has air passaging formed therein, at least part of the air passaging defining a portion of the air inlet passage. A torque selector is at least partially received in the end plate and includes a portion disposed in the air passaging defined in the end plate and at least partially blocking the flow of air in the air passaging except through the portion of the torque selector.

25 Claims, 15 Drawing Sheets

PNEUMATIC ROTARY TOOL

BACKGROUND OF THE INVENTION

This invention generally relates to pneumatic rotary tools and more particularly to an improved pneumatic rotary tool having a plastic housing and a variable torque design for efficient use of pressurized air.

The invention is especially concerned with a powered tool that rotates an output shaft with a socket for turning a fastener element such as a bolt or nut. Tools of this type are frequently used in automotive repair and industrial applications. Most pneumatic rotary tools comprise a metallic outer housing with multiple metallic internal parts. These tools are strong and durable due to their metallic construction, although the all-metal construction makes them both somewhat heavy and costly. Pressurized air flowing through the tool powers tools of this type. As the air expands within the tool, it induces motion of an internal motor, powering the tool.

It is an aim of tool manufacturers to provide a pneumatic rotary tool that is as durable as an all-metal tool, but employs portions formed from lighter materials, such as plastic, where appropriate to reduce the weight and cost of the tool. One difficulty in the design of such a tool is the reduced rigidity of plastic as compared with a strong metal, such as steel. For example, plastic components in passageways used to direct the pressurized air may deform under pressure. Such deformation may allow the pressurized air to prematurely escape the tool and thereby decrease the efficiency and/or the torque output of the tool.

SUMMARY OF THE INVENTION

Among the several objects and features of the present invention may be noted the provision of a pneumatic rotary tool which weighs and costs less due to plastic components; the provision of such a pneumatic rotary tool which inhibits pressurized air from prematurely escaping the tool; and the provision of such a pneumatic rotary tool which makes efficient use of pressurized air.

Generally, a pneumatic rotary tool of the present invention comprises a housing formed of a plastic material and including a motor receptacle having a front end and an open rear end. An end cover is formed separately from the motor receptacle and is located at the rear end of the motor receptacle. An air motor is disposed within the motor receptacle of the housing. An air inlet is supported by the housing and is constructed for connection to a source of pressurized air. An air inlet passage extends from the air inlet to the motor for delivering pressurized air to the motor to power the motor to drive an output shaft. An air exhaust is supported by the housing and an air exhaust passage extends from the motor to the air exhaust for exhausting air from the motor to outside the tool housing. The air motor comprises a cylindrical support sleeve having at least one open end, a rotor rotatable within the support sleeve, an end plate at the open end of the support sleeve substantially closing the open end. The end plate has air passaging formed therein, at least part of the air passaging defining a portion of the air inlet passage. A torque selector is at least partially received in the end plate and includes a portion disposed in the air passaging defined in the end plate and at least partially blocking the flow of air in the air passaging except through the portion of the torque selector.

In another aspect of the invention, the pneumatic rotary tool comprises a housing made of plastic, an air motor disposed within the housing and an air inlet supported by the housing and constructed for connection to a source of pressurized air. An air inlet passage extends from the air inlet to the motor for delivering pressurized air to the motor to power the motor to drive an output shaft. A torque selector is at least partially received in the motor and defines a portion of the air inlet passage. An air exhaust is supported by the housing and an air exhaust passage extends from the motor to the air exhaust for exhausting air from the motor to outside the tool housing. The portion of the air inlet passage defined by the torque selector is made of metal and is not made of plastic.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
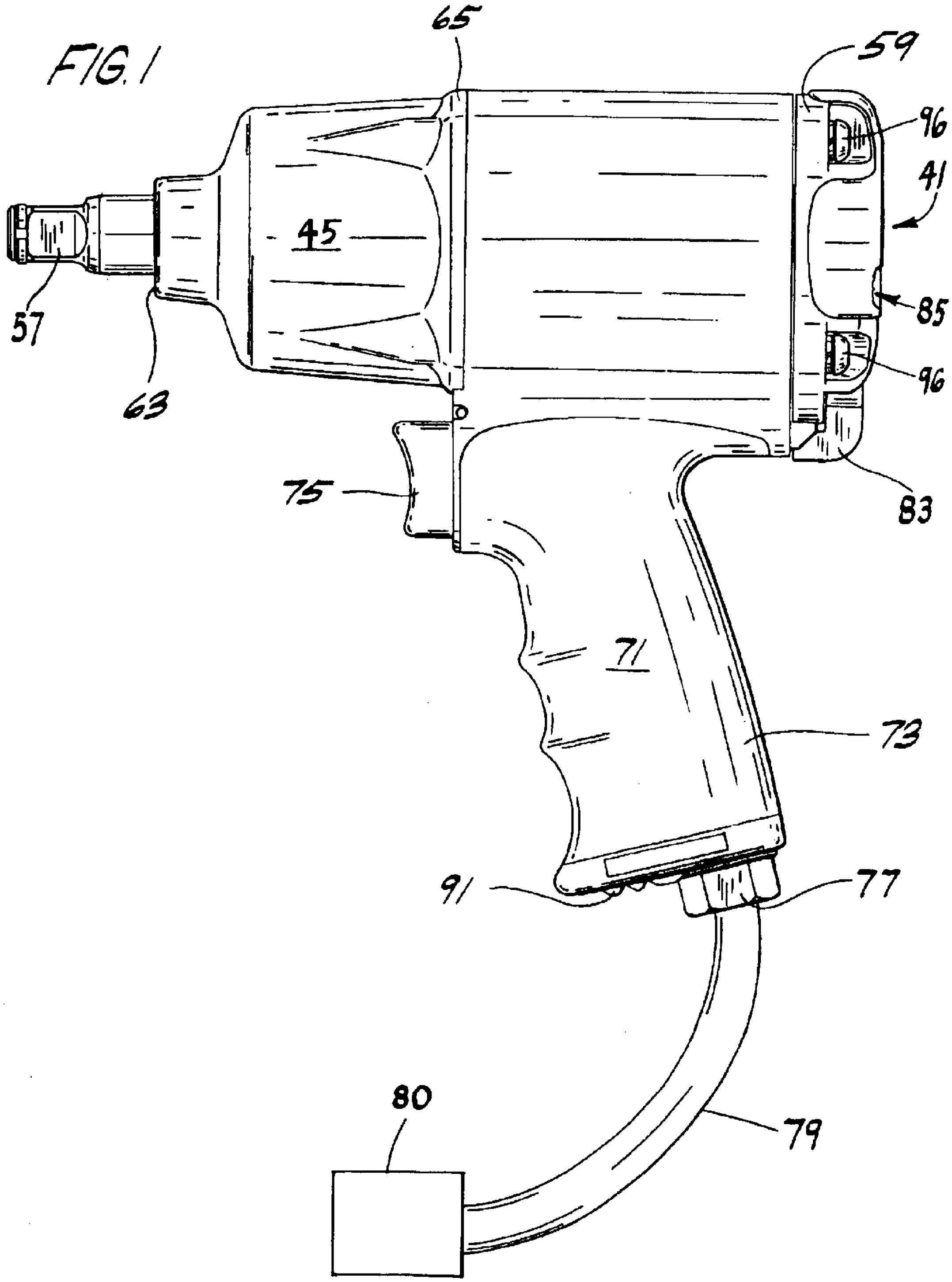
FIG. 1 is a side elevation of a pneumatic rotary tool of an embodiment of the present invention.
Figure 2:
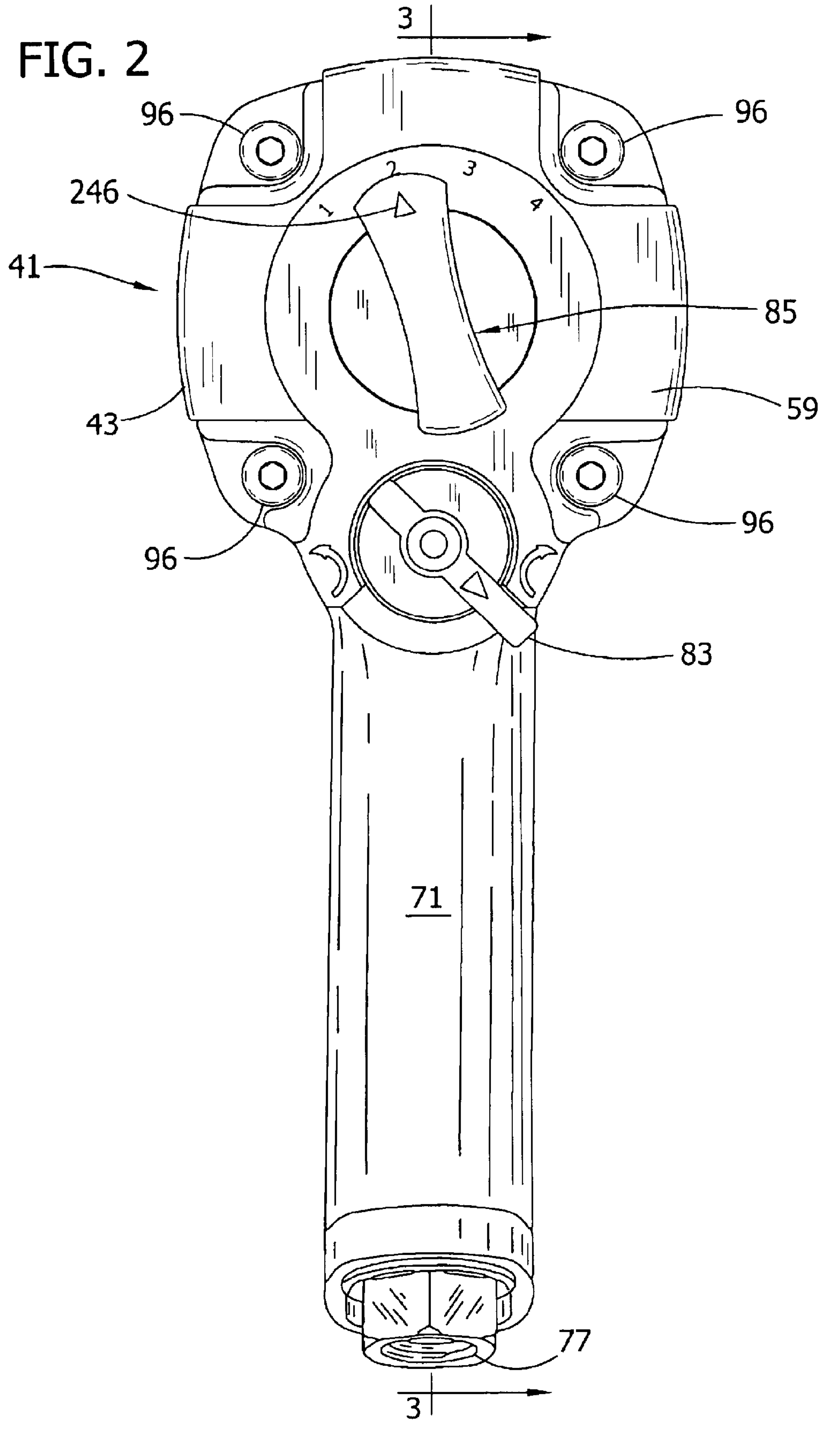
FIG. 2 is a rear elevation of the tool of FIG. 1.
Figure 3:
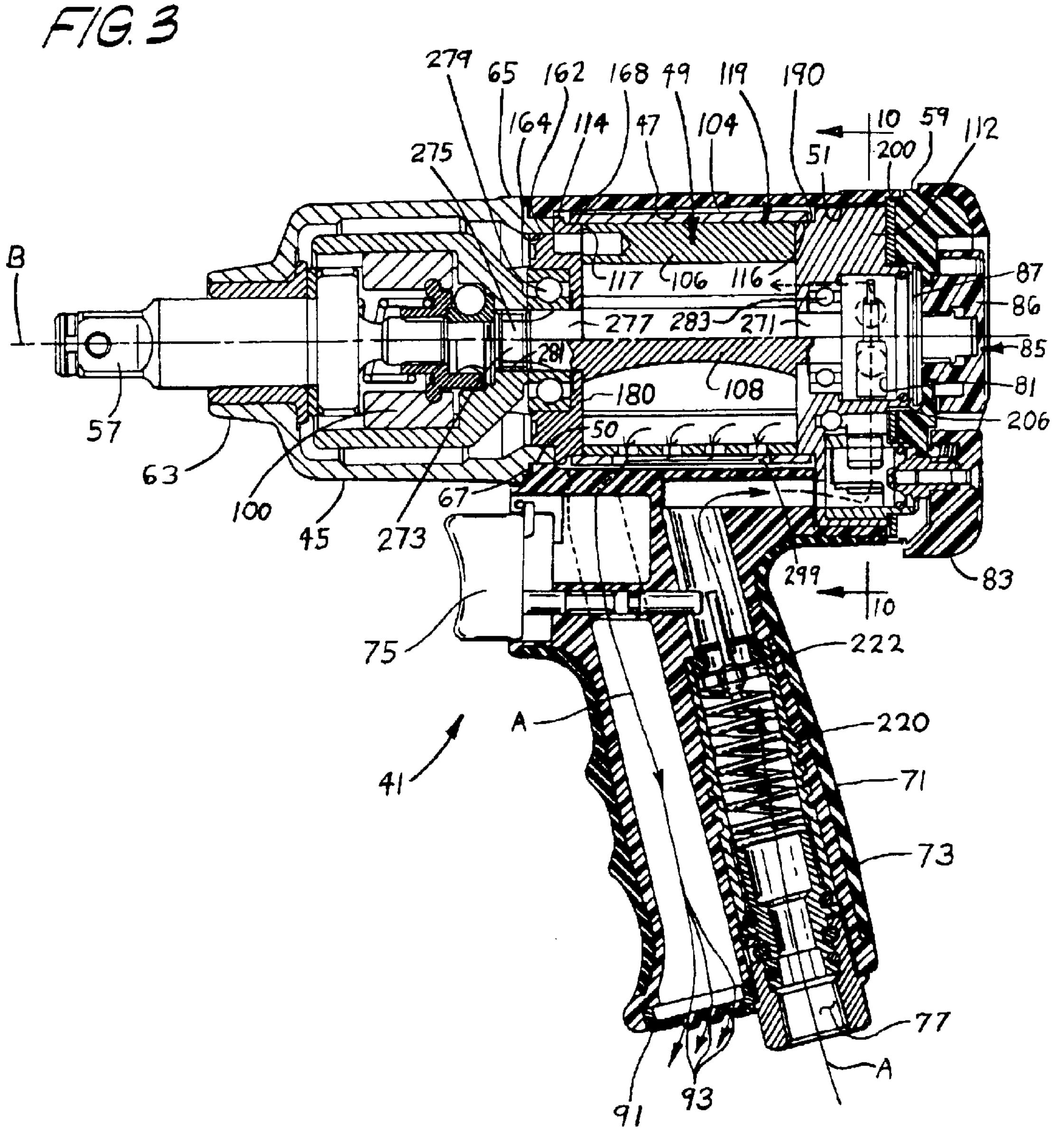
FIG. 3 is a section of the tool taken in a plane including line 3—3 of FIG. 2.

Referring now to the drawings and specifically to FIGS. 1–3, a pneumatic rotary tool of an embodiment of the present invention is generally indicated at 41. The tool includes a housing 43, a Maurer Mechanism casing 45 at the front of the housing and a motor receptacle 47 (FIG. 3) disposed rearwardly of the casing and sized and shaped for receiving an air motor, generally indicated at 49. The receptacle 47 has a front end 50 and an open rear end 51. The tool 41 also includes an output shaft 57 extending from the front of the housing 43 and an end cover 59 located at the rear end 51 of the receptacle 47 to close the receptacle. The end cover 59 is formed separately from the receptacle 47. The casing 45 may be considered part of the housing 43, due to the generally uniform interface between the housing and casing, which creates the appearance of one continuous profile when viewing the tool 41. The output shaft 57 extends from a front end 63 of the Maurer Mechanism casing 45. A back end 65 of the Maurer Mechanism casing 45 engages the housing 43, more particularly the back end engages the front end 50 of the motor receptacle 47. A gasket 67 (FIG. 3) seals the interface between the back end 65 of the Maurer Mechanism casing 45 and the housing 43 to keep lubricating fluids within the tool 41. The gasket 67 is preferably formed from a fibrous material, such as paper, but may also be formed from rubber, cork, plastic or any other suitable material. The tool 41 further comprises a grip 71 extending downwardly from the housing 43, allowing a user to grasp and hold the tool securely. The grip 71 has an additional outer layer 73 of soft material, such as rubber, to cushion and ease pressure on the user's hand, while increasing friction between the grip 71 and the user, making the tool 41 easier to hold. A trigger 75 extends from the front of the grip 71 for activating the tool 41. Furthermore, the tool 41 comprises an air inlet 77 for supplying pressurized air to the tool. The air inlet 77 mounts on the lower portion of the grip 71 and receives an air hose 79 from a source 80 of pressurized air (schematically shown in FIG. 1), as is conventional in the industry. The air inlet forms a portion of an air inlet passage 81 extending from the air inlet 77 to the motor 49 for delivering pressurized air to the motor to power the motor to drive the output shaft 57. Other portions of the air inlet passage 81 will be described hereinafter.

Still referring to FIGS. 1–3, the tool 41 additionally includes a rotation selector valve 83 mounted on the rear of the housing 43 for selecting the rotational direction of the output shaft 57. The rotation selector valve 83 is rotatable within the housing 43 and end cover 59 for altering a flow of compressed air within the tool 41 to control the direction of output shaft 57 rotation. A torque selector generally designated 85 is mounted on the end cover 59 is rotatable within the end cover for controlling the torque of the tool 41 by at least partially blocking or throttling the flow of compressed air. The torque selector includes a knob 86 made of plastic which receives a throttle member 87 made of metal. The knob 86 and the throttle member 87 are suitably fixed to each other so that rotation of the knob about an axis of rotation of the selector 85 causes rotation of the throttle member. However, the knob 86 and throttle member 87 may be made as an integral, one-piece structure within the scope of this invention. In the illustrated embodiment, the torque selector 85 has four discrete positions corresponding to four torque settings. An indexing mechanism (not shown), such as a ball/spring-type indexing mechanism, may be provided to indicate to the user that the selector 85 is positioned at one of the discrete positions. A suitable indexing mechanism is described in PCT application No. PCT/IB01/01374, which is incorporated herein by reference. The functioning of the rotation selector valve 83 and the torque selector 85 will be discussed in greater detail below.

Additionally, an air exhaust 91 mounts on the lower portion of the grip 71, adjacent the air inlet 77 (FIG. 3). The air exhaust 91 includes a plurality of small holes 93 for diffusing exhaust air as it exits the tool 41, directing exhaust air away from the user and preventing foreign objects from entering the air exhaust.

Figure 4:
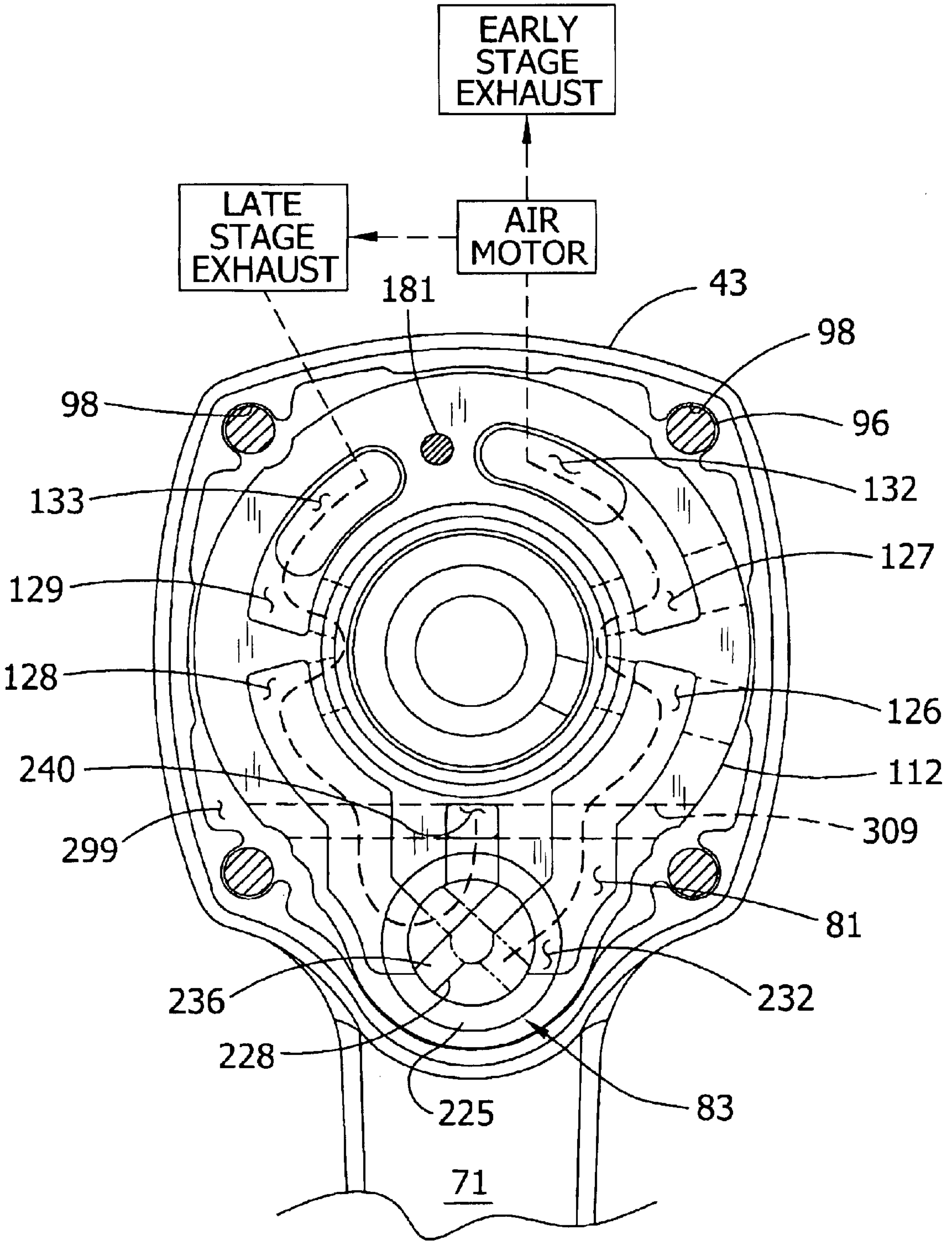
FIG. 4 is a fragmentary schematic rear elevation with an end cover and a torque selector omitted to reveal internal construction.
Figure 9:
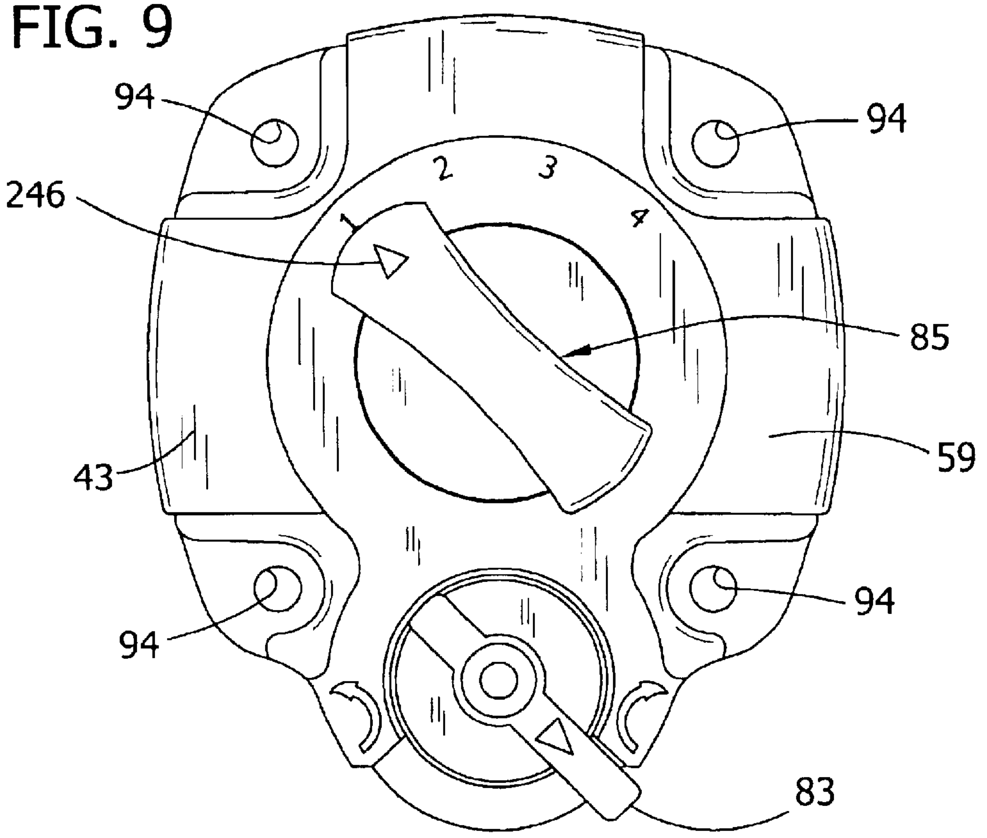
FIG. 9 is a rear elevation of the end cover with a torque selector positioned to a setting of 1.

The end cover 59 mounts on the rear end of the housing 43 (FIG. 3). Four bolt holes 94 formed in the end cover 59 receive threaded bolts 96 for attaching the end cover 59 and the Maurer Mechanism casing 45 to the housing 43 (FIGS. 2 and 9). The bolts 96 fit through the holes 94 in the end cover 59, pass through elongate bolt channels 98 formed within the housing 43 and fit into threaded holes (not shown) within the Maurer Mechanism casing 45, clamping the tool components together (FIGS. 2, 4 and 9).

The pneumatic rotary tool 41 is of the variety of rotary tools known as an impact wrench. A Maurer Mechanism 100 (FIG. 3), contained within the Maurer Mechanism casing 45 and discussed below, converts high speed rotational energy into discrete, high torque moments on the output shaft 57. Because the high torque impacts are limited in duration, an operator can hold the tool 41 while imparting a larger moment on the output shaft 57 than would be possible were the high torque continually applied. Impact tools are useful for high torque applications, such as tightening or loosening bolts from a vehicle wheel.

Figure 24:
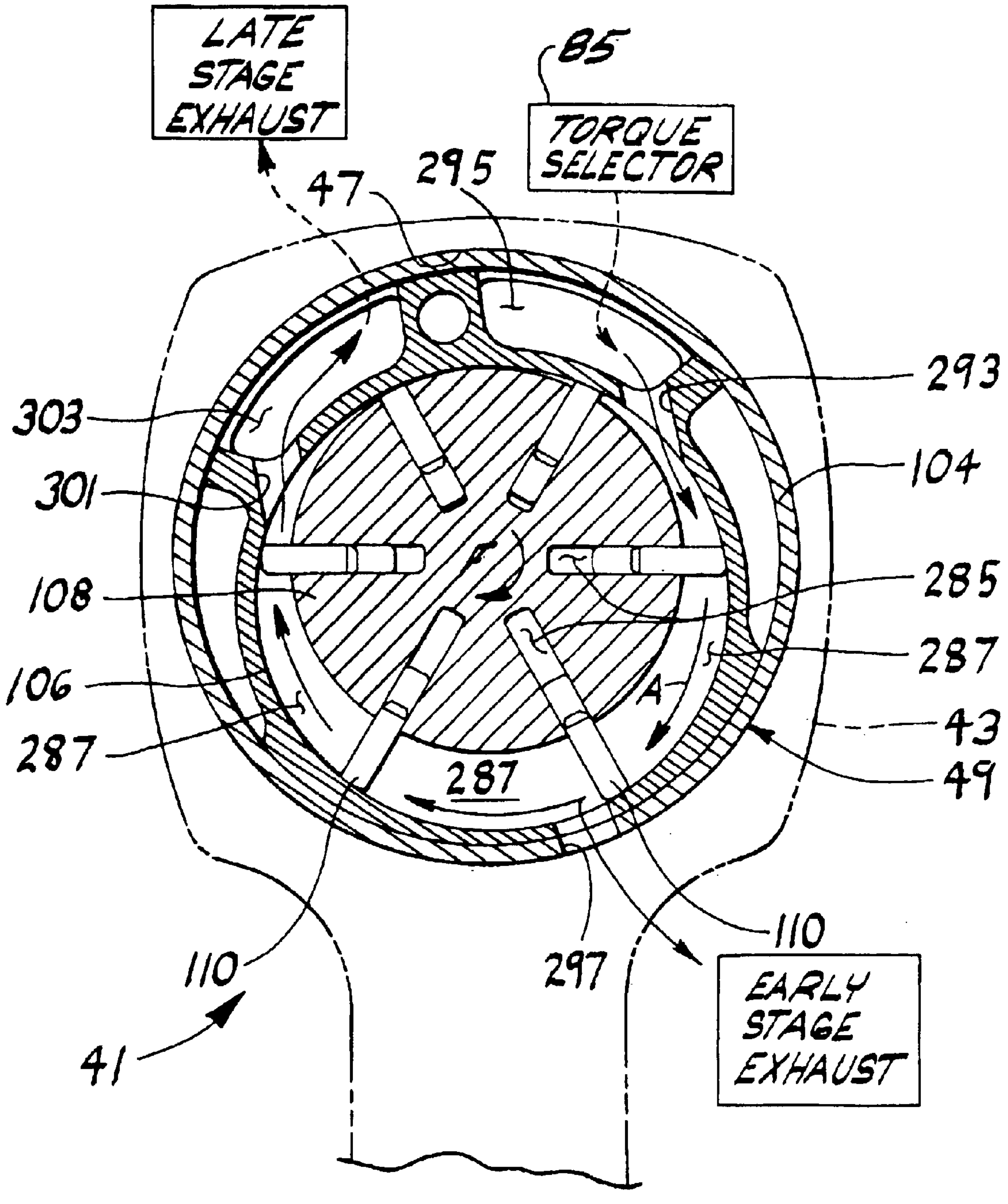
FIG. 24 is a section of an air motor of the tool taken at the center of the motor schematically showing the flow of air.
Figure 26:
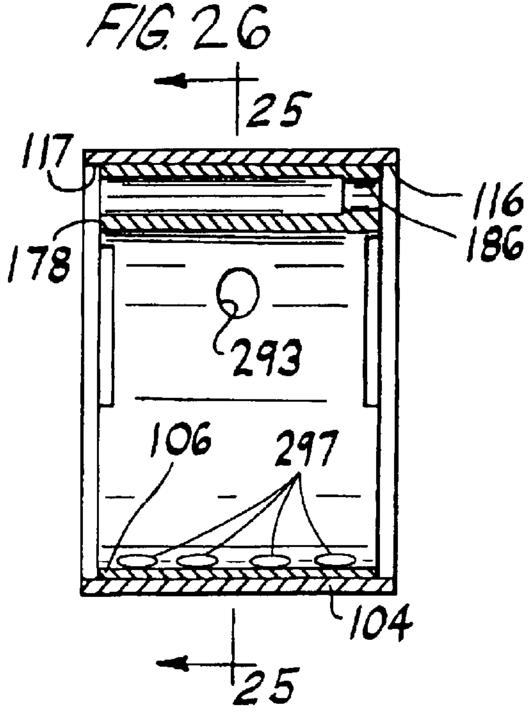
FIG. 26 is a section of the support sleeve and the passaging sleeve taken in the plane including line 26—26 of FIG. 25.
Figure 25:
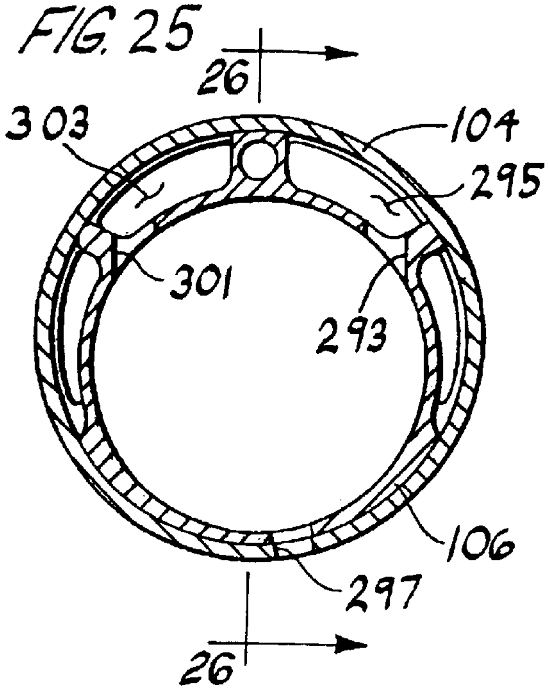
FIG. 25 is a section of a support sleeve and a passaging sleeve taken in the plane including line 25—25 of FIG. 26.

As best shown in FIGS. 3 and 24–26, the air motor 49 includes a cylindrical support sleeve 104, a passaging sleeve 106 and a rotor 108 rotatable within the passaging and support sleeves and having a plurality of vanes 110. The air motor further includes a first end plate 112 and a second end plate 114. The support sleeve 104 has a first open end 116 and a second open end 117, so that the passaging sleeve 106 mounts within the support sleeve (FIGS. 25 and 26). The first end plate 112 closes the first open end 116, and the second end plate 114 closes the second open end 117. The first and second end plates 112, 114 are made of metal and are formed separately from the support and passaging sleeves 104, 106. The end plates 112, 114 and sleeves 104, 106 may be economically manufactured as separate pieces as described in PCT application No. PCT/IB01/01374.

Figure 19:
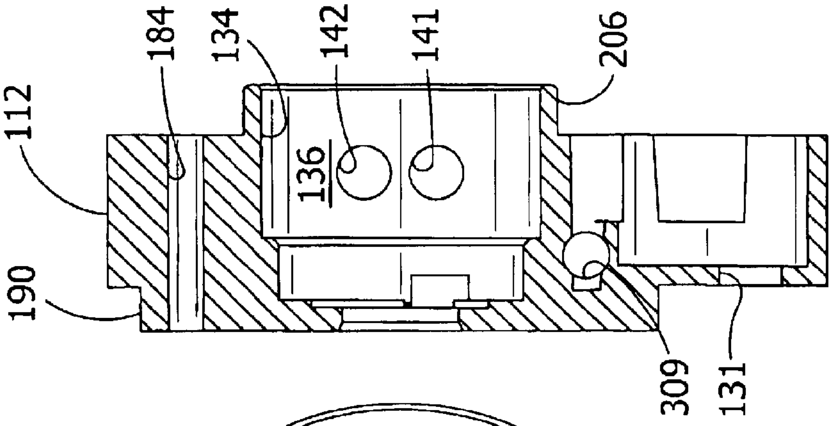
FIG. 19 is a section of the first end plate taken along lines 19—19 of FIG. 17.
Figure 18:
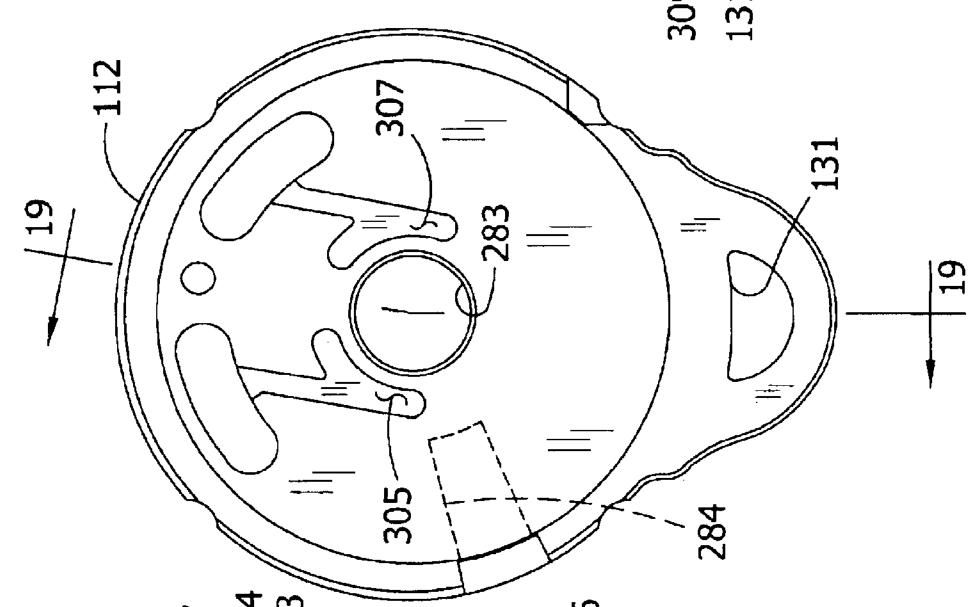
FIG. 18 is a front elevation of the first end plate.
Figure 17:
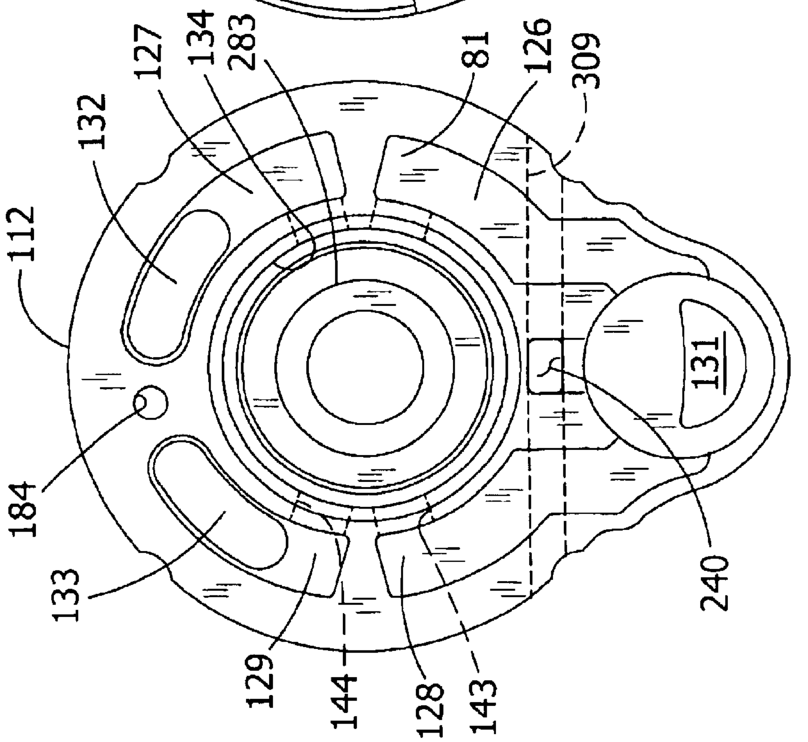
FIG. 17 is a rear elevation of the first end plate.
Figure 22:
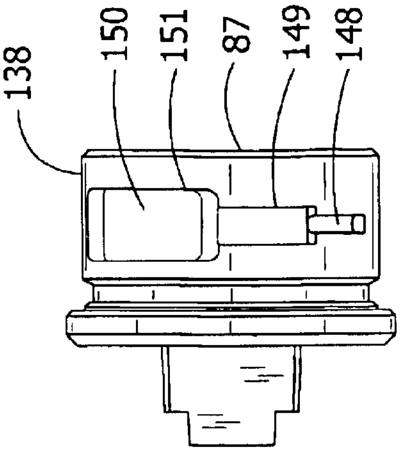
FIG. 22 is a right side elevation of the throttle member.
Figure 23B:
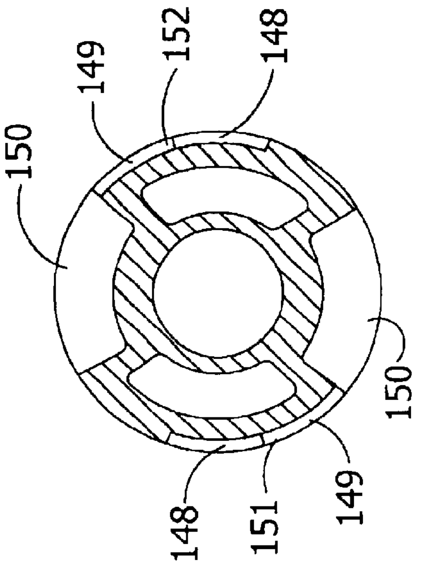
FIG. 23B is a section view taken along lines 23B—23B of FIG. 20.
Figure 21:
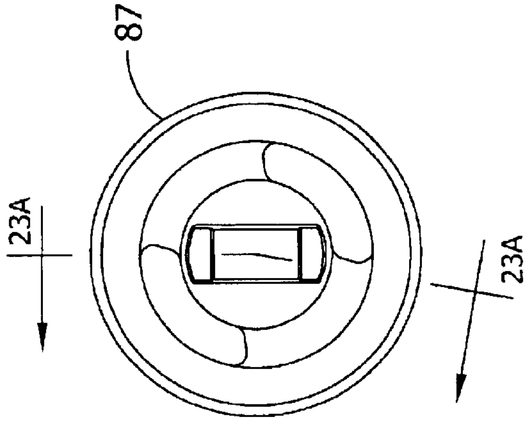
FIG. 21 is a rear elevation of the throttle member.
Figure 23A:
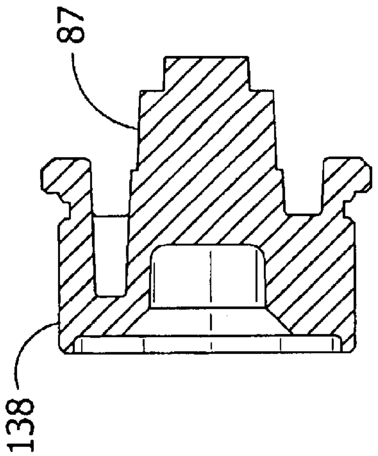
FIG. 23A is a section view taken along lines 23A—23A of FIG. 21.
Figure 20:
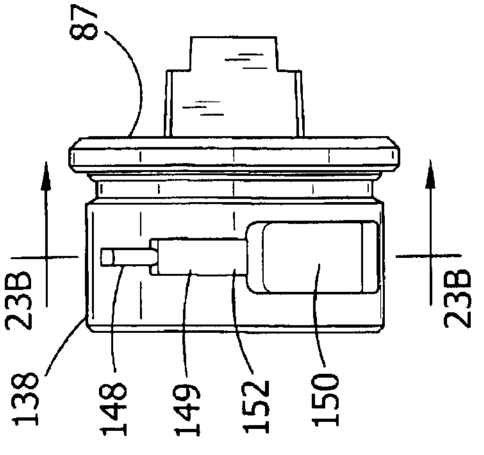
FIG. 20 is a left side elevation of a throttle member of the torque selector.

Referring to FIGS. 3, 4, 10 and 17–19, the first end plate 112 has a front face 120 directed toward the air motor 49 and a rear face 122 opposite the front face. Air passaging within the first end plate 112, which defines a portion of the air inlet passage 81, includes first and second channels 126, 127 and third and fourth channels 128, 129. The first and third channels 126, 128 are adapted for fluid communication with an inlet opening 131. As shown in FIGS. 17–19, the inlet opening 131 of this embodiment is semi-circular in shape. Air is received from the air inlet passage 81 through the inlet opening 131 and then passes to the first or third channels 126, 128. The air then passes from the first channel 126 to the second channel 127, or from the third channel 128 to the fourth channel 129, through the torque selector 85, as is further described below. The air passaging within the first end plate 112 also includes a first motor opening 132 in fluid communication with the second channel 127 and with the motor 49, and a second motor opening 133 in fluid communication with the fourth channel 129 and with the motor 49. The air passaging of the first end plate 112 further includes a torque selector receptacle 134 suitably sized and shaped to receive at least a portion of the torque selector 85. In this embodiment, the receptacle 134 has a generally cylindrical inner surface 136. The throttle member 87 of the torque selector 85 has a generally cylindrical outer surface 138 which is in face-to-face relation with the inner surface 136 of the receptacle 134. An O-ring (not shown) or other suitable means may be used to form a seal between the throttle member 87 and the receptacle 134. The torque selector 85, including the throttle member 87, is pivotable about the axis of rotation of the torque selector in the torque selector receptacle 134.

The first end plate 112 includes a first hole 141 extending radially through the inner surface 136 to the first channel 126 for fluid communication between the first channel and the receptacle 134. A second hole 142 extends radially through the inner surface 136 to the second channel 127 for fluid communication between the second channel and the receptacle 134. Likewise, a third hole 143 and a fourth hole 144 extend radially through the inner surface 136 to the third and fourth channels 128, 129, respectively, for fluid communication between the third and fourth channels and the receptacle 134.

Referring to FIGS. 10, 20–22, 23A and 23B, the throttle member 87 of the torque selector includes two sets, generally designated 151 and 152, of first, second and third circumferentially extending grooves 148, 149, 150 in its outer surface 138. The first set 151 is disposed for selective registration with the first and second holes 141, 142 in the torque selector receptacle 134 to permit fluid communication from the first channel 126 to the second channel 127 by way of one of the grooves 148, 149, 150 of the throttle member 87. The second set 152 is disposed (generally opposite the first set 151) for selective registration with the third and fourth holes 143, 144 in the receptacle 134 to permit fluid communication from the third channel 128 to the fourth channel 129 by way of one of the grooves of the throttle member 87. In this embodiment, each set of grooves (151 and 152) includes three grooves, though more or less are contemplated. The grooves 148, 149, 150 of the first set 151 are in fluid communication with each other and have different cross-sectional areas for controlling the pressure of the air passing through the torque selector 85 thereby to control the torque of the air motor and the torque output in the forward direction, as further described below. Similarly, the grooves 148, 149, 150 of the second set 152 are in fluid communication with each other and have different cross-sectional areas for controlling the pressure of the air passing through the torque selector 85 thereby to control the torque of the air motor and the torque output in the reverse direction, as further described below.

Figure 29:
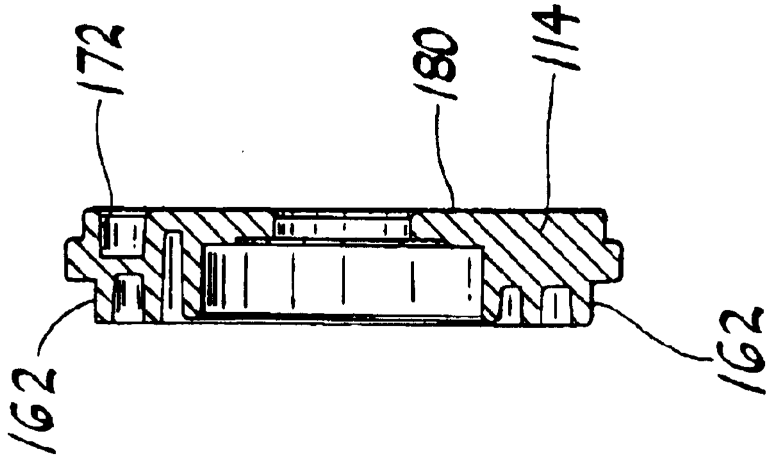
FIG. 29 is a section view of the second end plate taken in the plane including line 29—29 of FIG. 28.
Figure 28:
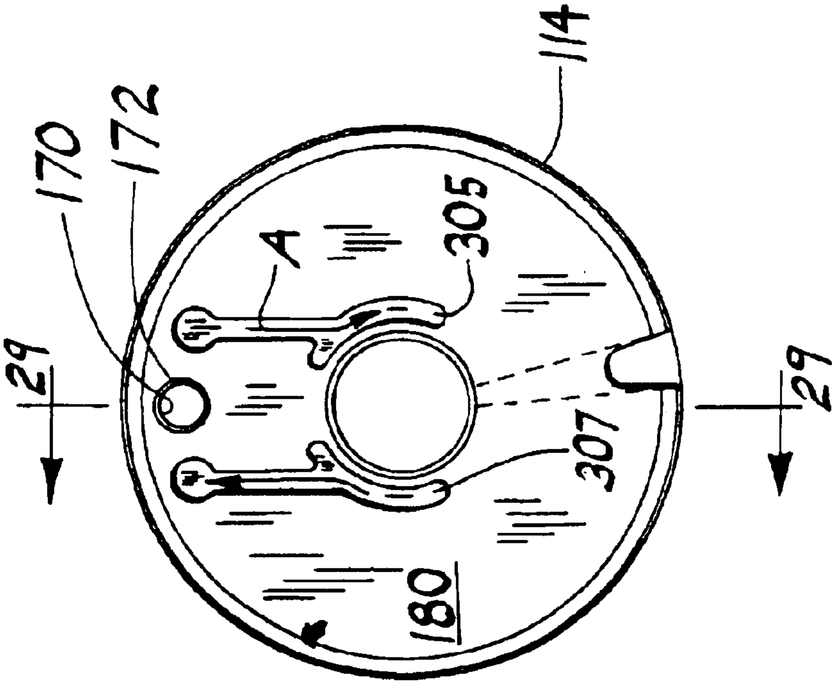
FIG. 28 is a rear elevation of a second end plate.

Referring to FIG. 3, the end plates 112,114 engage and support the support and passaging sleeves 104,106 against canting with respect to the housing 43 under forces experienced by the tool 41 in use. Three distinct shoulder connections cooperate to rigidly connect the air motor 49, the Maurer Mechanism casing 45 and the housing 43. The second end plate 114 has a front external shoulder 162 engageable with a rear internal shoulder 164 of the Maurer Mechanism casing 45. The engagement of the shoulders 162,164 orients the Maurer Mechanism casing 45 and the second end plate 114 so that the two are aligned along their cylindrical axes. In addition, the length of the shoulder 164 helps support the first end plate 112 within the Maurer Mechanism casing 45 to inhibit the two pieces from becoming misaligned should the tool be subjected to a large impact (e.g., if dropped). The second end plate 114 further includes a rear external shoulder 168 engageable with the support sleeve 104 (FIG. 3) and a tubular orientation pin 170 (FIG. 28) having one end received within a hole 172 (FIG. 29, pin 170 is omitted from FIG. 29 for clarity) of the second end plate and an opposite end received within a hole 186 of the passaging sleeve 106 (FIG. 26). Orientation pin 170 orients the second end plate 114 and the passaging sleeve 106 with respect to each other. Because both the second end plate 114 and the passaging sleeve 106 are circular, the orientation pin 170 is advantageous upon assembly to properly orient the two parts.

The passaging sleeve 106 is shorter front to rear than the support sleeve 104 so that a front surface 178 of the passaging sleeve 106 is designed for flatwise engagement with a rear surface 180 of the second end plate 114. The support sleeve 104 extends forward beyond this surface, engaging the rear external shoulder 168 of the second end plate 114. Preferably, an orientation pin 181 extends from the end cover 59 through a hole 182 in gasket plate 200, through a hole 184 in the first end plate 112 and into a hole 186 of the passaging sleeve 106. The shoulder 168 axially aligns the second end plate 114 with the support and passaging sleeves 104, 106 and inhibits misalignment of the second end plate and the sleeves. The orientation pin 181 orients the first end plate 112 and passaging sleeve 106, orienting the parts with respect to one another, similar to the pin 170. Finally, the first end plate 112 includes a front external shoulder 190 for engagement with the support sleeve 104 similar to the rear external shoulder 168 of the first end plate 112.

Figure 27:
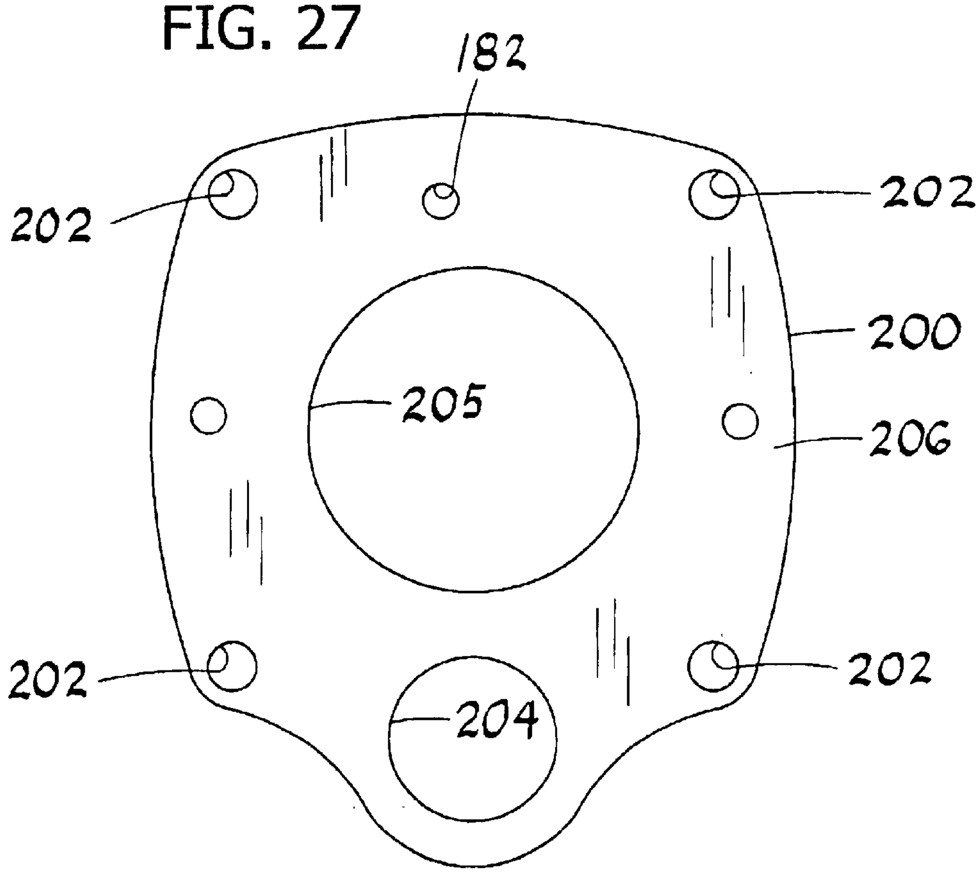
FIG. 27 is a rear elevation of a gasket plate of the tool.

Referring to FIGS. 3 and 27, the gasket plate 200 sealably engages the first end plate 112 and closes the rearward opening of each channel 126, 127, 128, 129. Bolt openings 202 are arranged at the four corners of the gasket plate for receiving bolts 96. A rotation selector valve opening 204 allows the rotation selector valve 83 to pass through the gasket plate 200. A central opening 205 receives a lip 206 of the first end plate 112. The gasket plate 200 is preferably metal with an outer layer of rubber material 207 on both plate faces for sealing engagement with the end cover 59 and the first end plate 112. When fully assembled, the bolts 96 compress the gasket plate 200 against the first end plate 112 to seal the air passaging of the first end plate. Such sealing is advantageously accomplished by the rigid gasket plate 200, rather than the plastic end cover 59, to more reliably seal the air passaging and thereby inhibit premature escape of compressed air from the tool. The gasket plate 200 is preferably formed from steel, although other metallic and non-metallic materials exhibiting strength characteristics adequate to seal the air passaging are also contemplated as within the scope of the present invention.

The four bolts 96 extending from the end cover 59 to the Maurer Mechanism casing 45 compress the internal components of the tool 41, securely seating the end plates 112,114 on the support sleeve 104. The interaction of the end cover 59, gasket plate 200, housing 43, support sleeve 104, passaging sleeve 106, end plates 112,114 and Maurer Mechanism casing 45 create a closed cylinder of considerable rigidity and strength. The multiple interlocking shoulder joints and compressive forces induced by the bolts 96 inhibit the air motor 49 from canting with respect to the housing 43. The air motor 49 fits snugly within the receptacle of the housing 43, inhibiting it from canting with respect to the output shaft 57.

Figure 6:
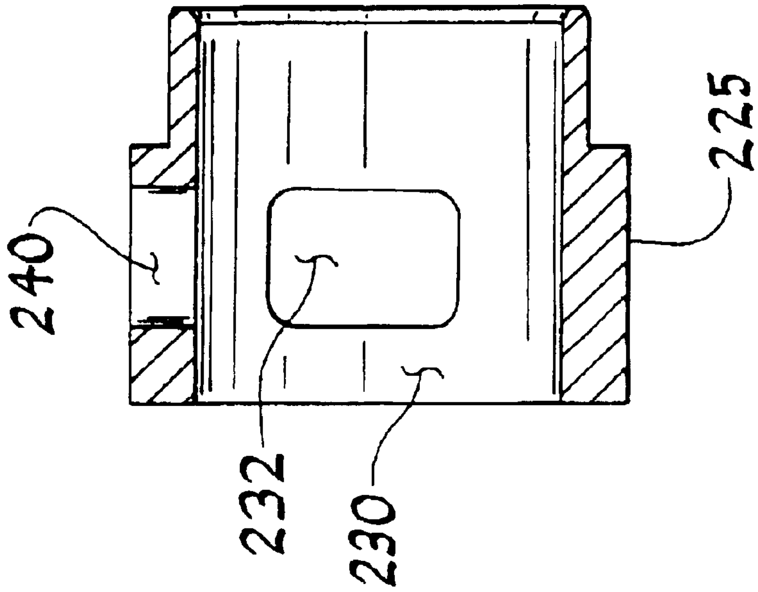
FIG. 6 is a section of the valve body taken in a plane including line 6—6 of FIG. 5.
Figure 5:
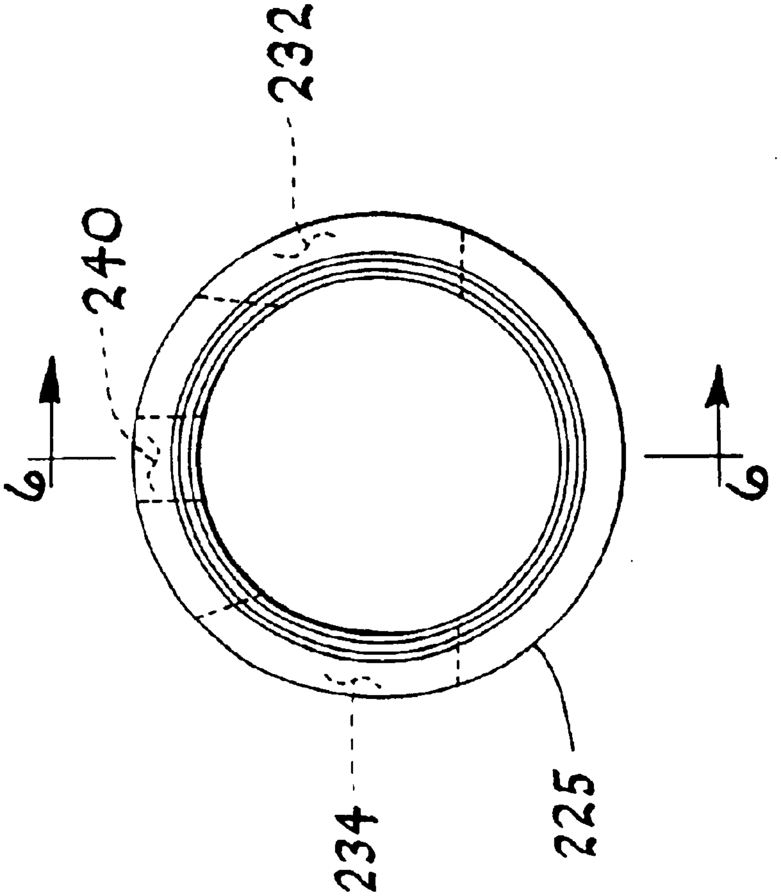
FIG. 5 is a rear elevation of a valve body.
Figure 8:
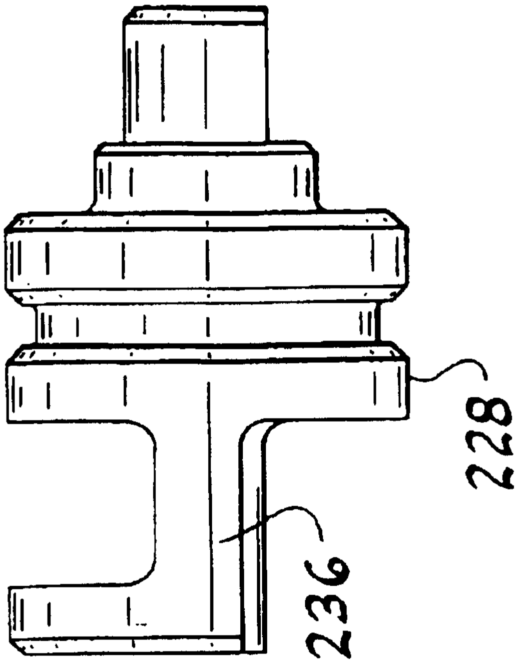
FIG. 8 is a right side elevation of the valve member of FIG. 7.
Figure 7:
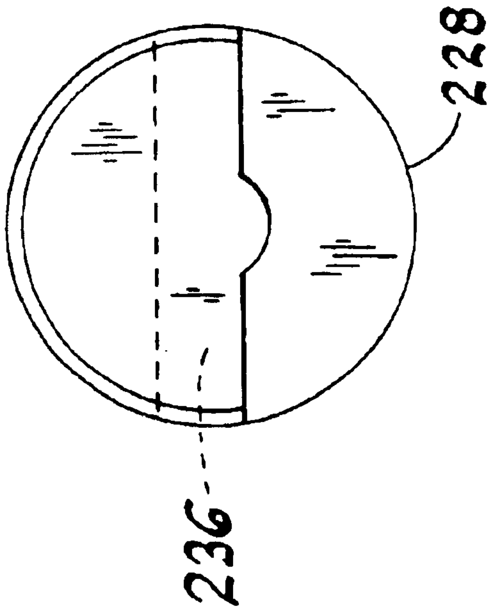
FIG. 7 is a front elevation of a valve member.

Referring again to FIG. 3, air flow through the tool 41 is generally indicated by line A. Following the path of line A, pressurized air first enters the tool 41 through the air inlet 77 (a portion of the air inlet passage 81), which includes an air inlet cylinder 220 and a tilt valve 222. The detailed construction and operation of the air inlet 77 and air inlet cylinder 220 are not critical to the invention. Their construction and operation are described in co-pending PCT application No. PCT/IB01/01374, which designates the U.S. and is incorporated herein by reference. The design of the tilt valve 222 is well known in the relevant art and will not be further described. The air then passes through the rotation selector valve 83 (also forming a portion of the air inlet passage 81) (FIGS. 3 and 4). The rotation selector valve 83 comprises two pieces, a valve body 225 (FIGS. 4, 5 and 6) fixed in position and a valve member 228 (FIGS. 7 and 8) rotatable within the valve body. The valve body 225 is tubular having a first open end 230 for allowing air to enter the rotation selector valve 83. The valve member 228 directs the flow of air through the valve body 225 and out through one of a first side port 232 or a second side port 234. The valve member 228 has an interior plate 236 rotatable with the valve member for directing the pressurized air.

Referring now to FIG. 4, when in a first position, the plate 236 is positioned so that the first channel 126 of the first end plate 112 is in fluid communication with the inlet opening 131 and the third channel 128 is blocked from fluid communication with the inlet opening. Thus, the plate 236 directs air through the first side port 232 to the first channel 126 for delivering air to the air motor 49, (FIG. 24) (discussed below), to power the motor and drive the output shaft 57 in the forward direction. When in a second position (shown in phantom in FIG. 4), the plate 236 is positioned so that the third channel is in fluid communication with the inlet opening and the first channel is blocked from fluid communication with the inlet opening. Thus, the plate 236 directs air through the second side port 234 and to the third channel 128 of the first end plate 112 for delivering air to the motor 49 to power the motor and drive the output shaft 57 in the reverse direction. The valve body 225 contains an additional top port 240 which allows a secondary air flow through the valve 83 simultaneous with air flow directed through either the first or third channels 126,128.

Once the air passes through the rotation selector valve 83, the air travels through the air passaging in the first end plate 112 toward the air motor 49. First, air passes through either the first or third channel 126, 128. Air directed through the channels 126, 128 passes through the torque selector 85 (FIGS. 9–15). The torque selector 85 controls the pressurized air, allowing the user to set a relatively precise output torque for the tool 41.

Figure 10:
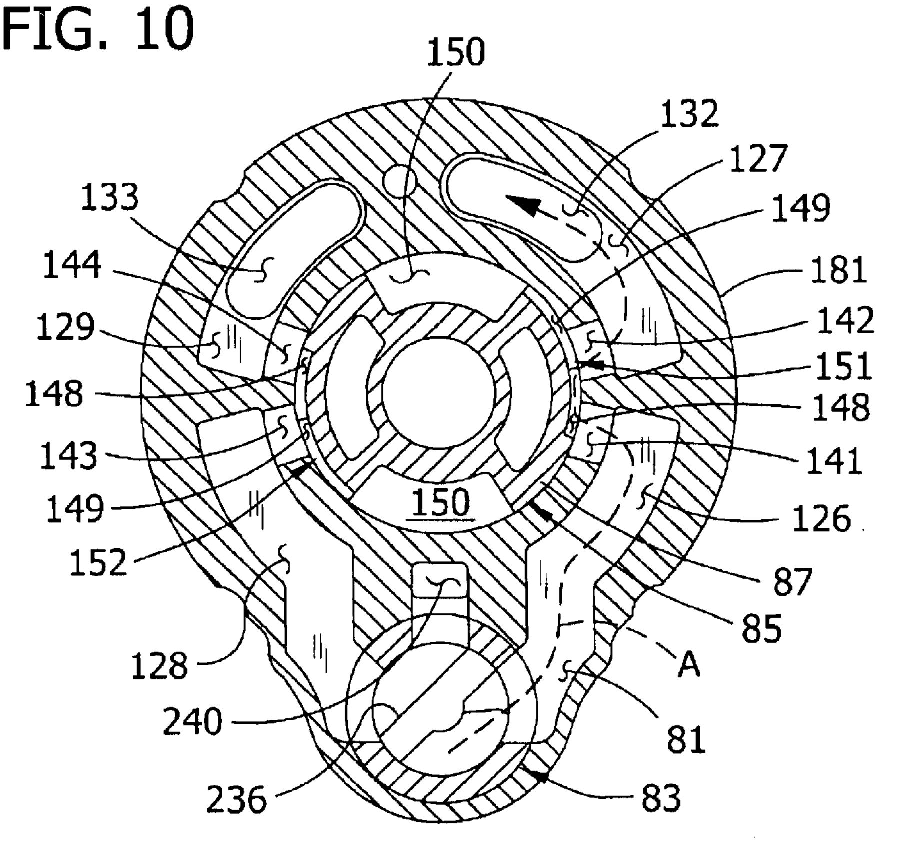
FIG. 10 is a section of the tool taken in a plane including line 10—10 of FIG. 3 but showing only a first end plate, the valve member and the torque selector in the position of FIG. 9.

Referring to FIGS. 9–15, the torque selector 85 rotates within the end cover 59 between four discrete settings. Referring more particularly to FIGS. 9 and 10, a first setting is shown. Viewing the torque selector 85 from the rear, an arrow indicator 246 on the torque selector indicates the setting of 1. The narrow first groove 148 of the first set 151 of grooves is aligned with at least a portion of the first hole 141 of the first channel 126 and with at least a portion of the second hole 142 of the second channel 127 (FIG. 10). The first groove 148 has a smaller cross-sectional area than the first or second channels 126, 127 and thus throttles or restricts the air (the air is indicated by the dotted line) passing from the first channel to the second channel and to the air motor 49. In this embodiment, air passes from the first channel 126 to the second channel 127 and to the motor 49 only through the torque selector 85. However, a second constant area opening to allow some constant air flow to the second channel is contemplated. The first setting corresponds to the lowest torque output because the first groove 148 has the smallest cross-sectional area of the grooves 148, 149 150 and thus allows the least amount of air to pass. As further shown in FIG. 10, the first groove 148 of the second set 152 of grooves is aligned similarly as the first groove of the first set 151 to control torque output in the reverse rotational direction. The first groove 148 of the second set 152 is aligned with portions of the third hole 143 and fourth hole 144. Thus, when the plate 236 of the rotation selector valve 83 is in its second position to reverse the direction of the output shaft 57, air flows through the third channel 128, through the first groove 148 of the second set 152 and then to the fourth channel 129. In this way, torque output is limited in both positions of the rotation selector valve 83.

Figure 11:
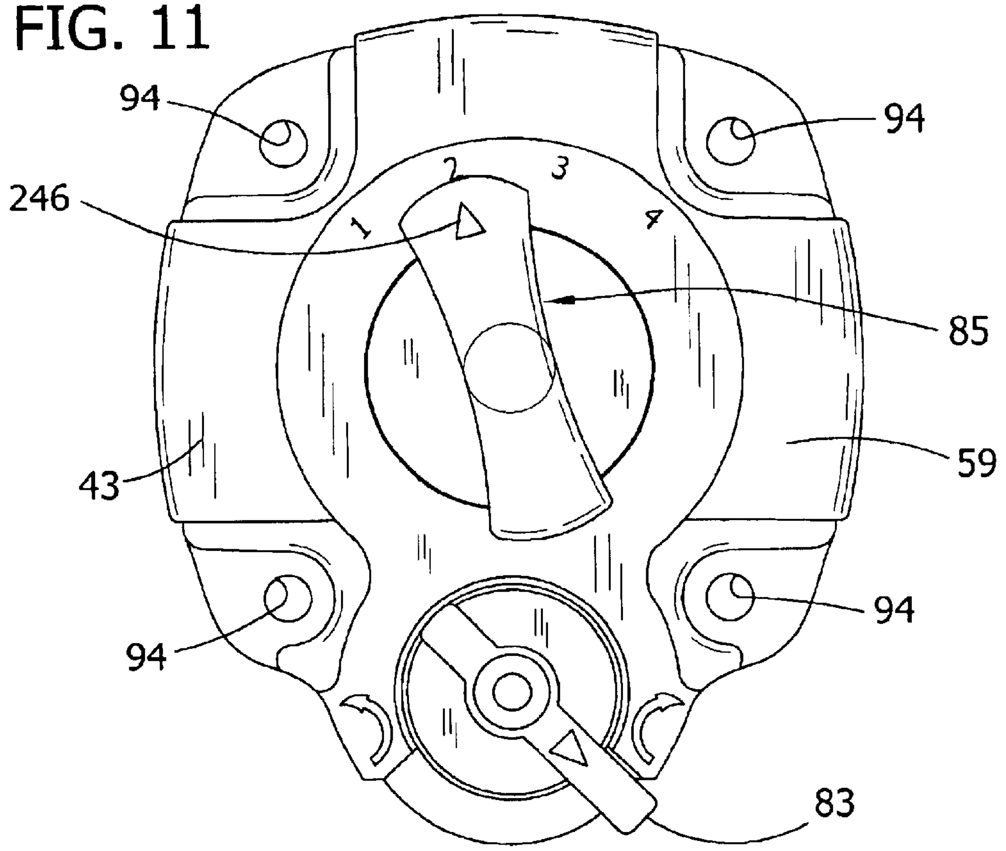
FIG. 11 is a rear elevation of the end cover with the torque selector positioned to a setting of 2.
Figure 12:
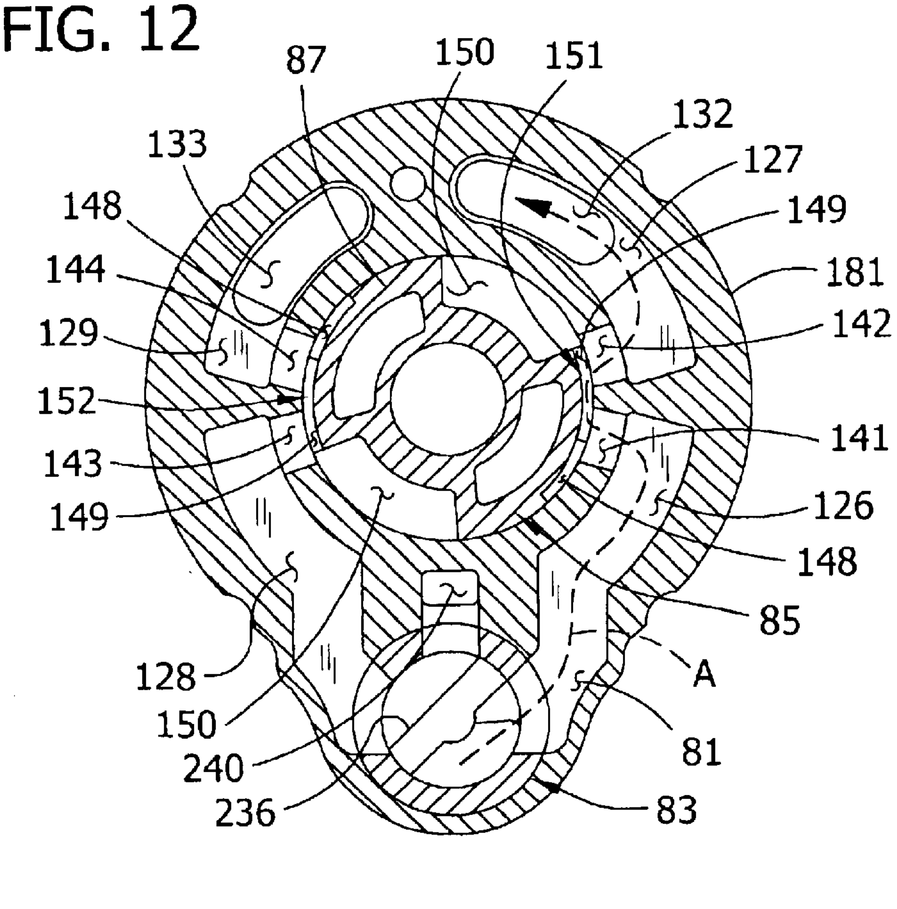
FIG. 12 is a section like FIG. 10, but illustrating the torque selector in the position of FIG. 11.

Referring to FIG. 11, the arrow indicator 246 indicates a setting of 2. As shown in FIG. 12, at the second setting the second groove 149 of the first set 151 of grooves is aligned with at least a portion of the first hole 141 of the first channel 126 and with at least a portion of the second hole 142 of the second channel 127. Like the first groove 148, the second groove 149 has a smaller cross-sectional area than the first or second channels 126, 127 and thus throttles the air passing from the first channel to the second channel. However, the second groove 149 has a larger cross-sectional area than the first groove 148 and thus more air passes from the first channel 126 to the second channel 127 at the second setting than the first setting. Similar to the first setting, when the torque selector 85 is in the second position to reverse the rotational direction, the second groove 149 of the second set 152 of grooves is also aligned to control air flow and torque output. The second groove 149 of the second set 152 is aligned with portions of the third hole 143 and fourth hole 144. Thus, when the plate 236 of the rotation selector valve 83 is in its second position, air flows through the third channel 128, through the second groove 149 of the second set 152 and then to the fourth channel 129.

Figure 13:
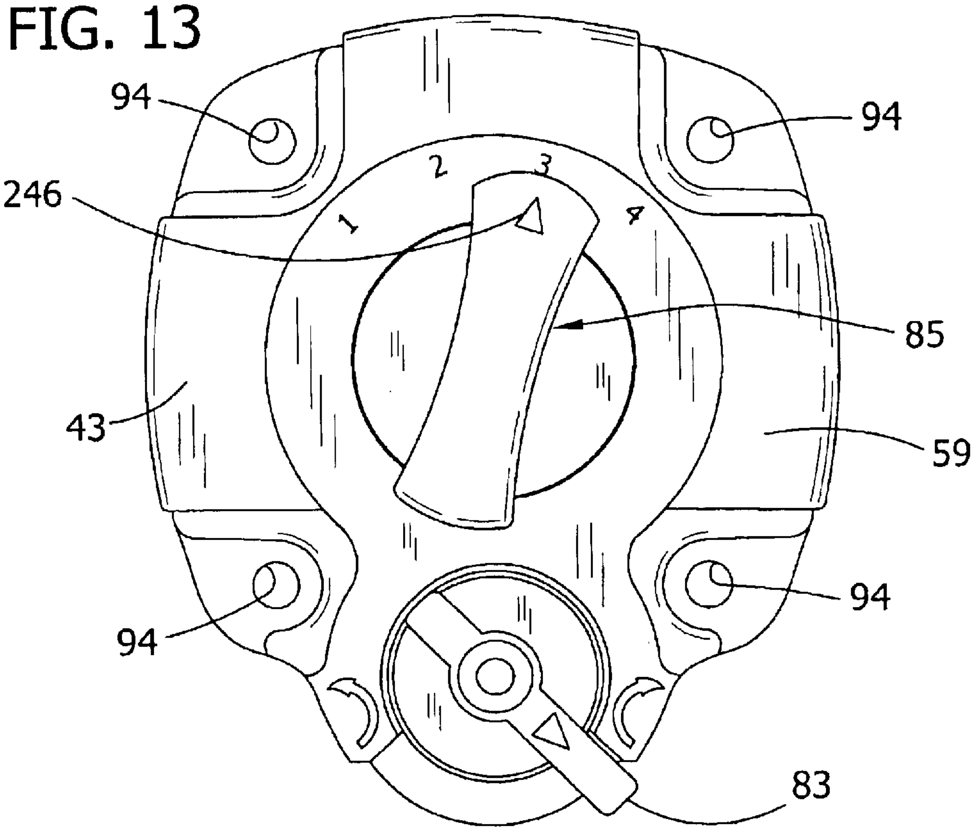
FIG. 13 is a rear elevation of the end cover with the torque selector positioned to a setting of 3.
Figure 14:
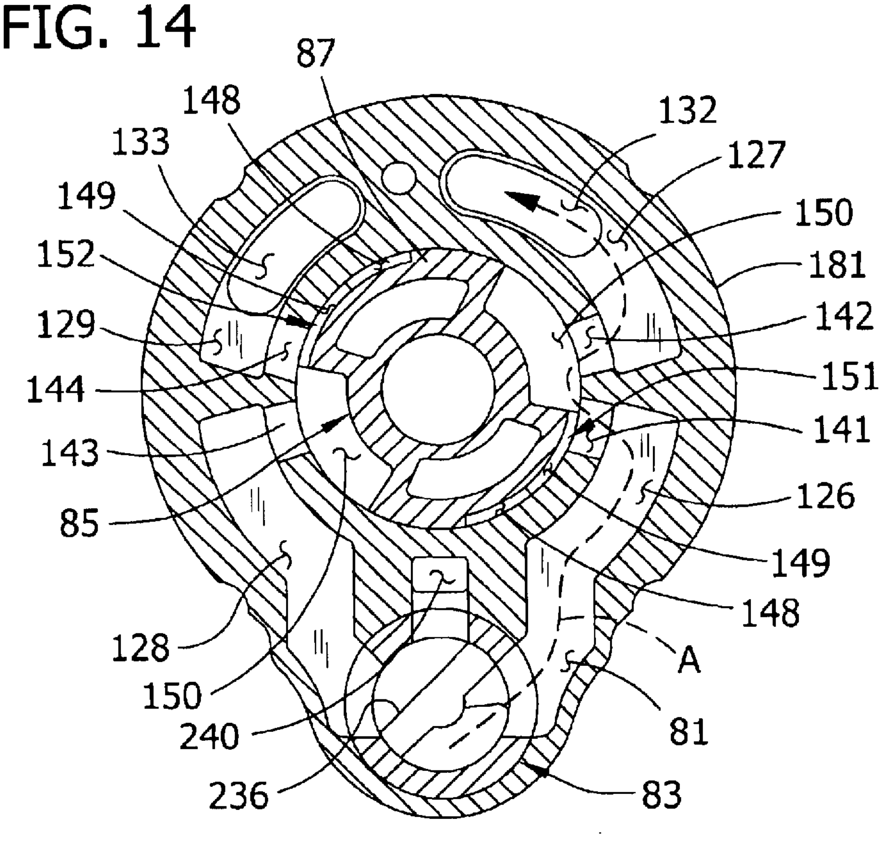
FIG. 14 is a section like FIG. 10, but illustrating the torque selector in the position of FIG. 13.
Figure 15:
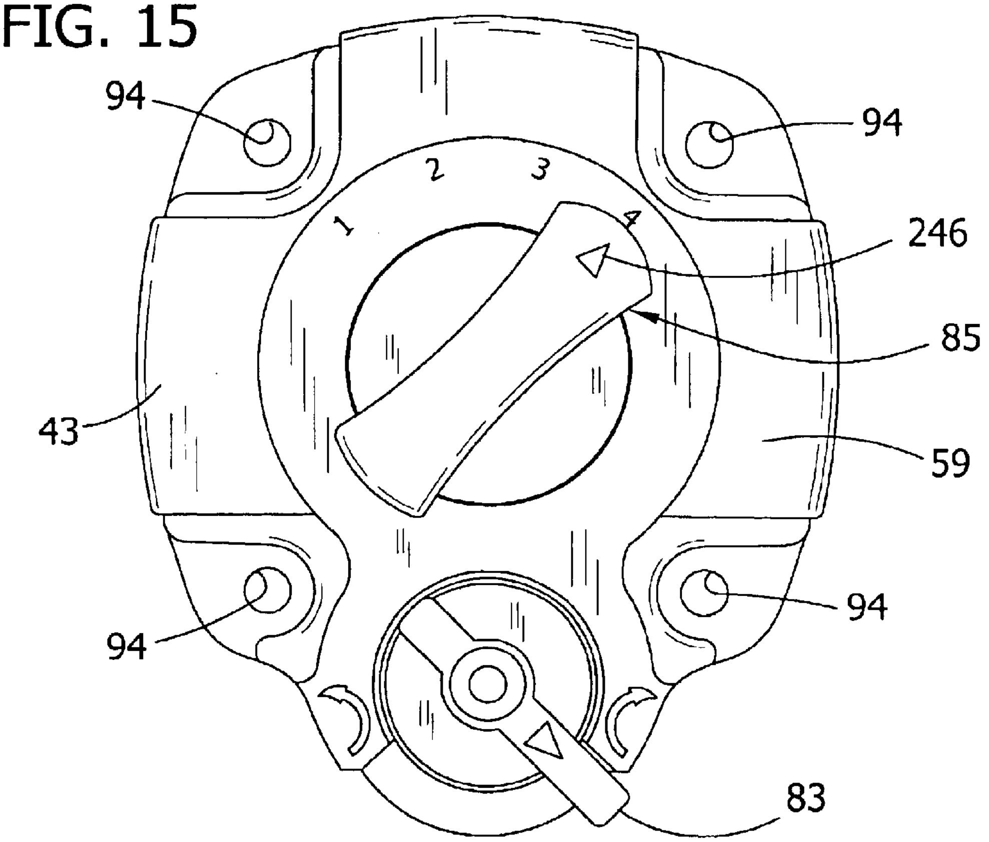
FIG. 15 is a rear elevation of the end cover with the torque selector positioned to a setting of 4.

Referring to FIGS. 13 and 14, the arrow indicator 246 indicates a setting of 3, where portions of the second groove 149 and the third groove 150 are aligned with the first hole 141, and the third groove is further aligned with the second hole 142. The third groove 150 has a significantly larger cross-sectional area than the second groove 149 and thus more air passes from the first channel 126 to the second channel 127 at the third setting than at the second setting. However, the portion of the second groove which is aligned with the first hole 141 serves to throttle or restrict the air passing from the first channel 126. As shown in FIG. 14, the second and third grooves 149, 150 of the second set 152 of grooves are also aligned to control air flow and torque output for reverse operation. The second and third grooves 149, 150 of the second set 152 are aligned with portions of the third hole 143 and fourth hole 144. Thus, when the plate 236 of the rotation selector valve 83 is in its third position, air flows through the third channel 128, through the second and third grooves 149, 150 of the second set 152 and then to the fourth channel 129.

Figure 16:
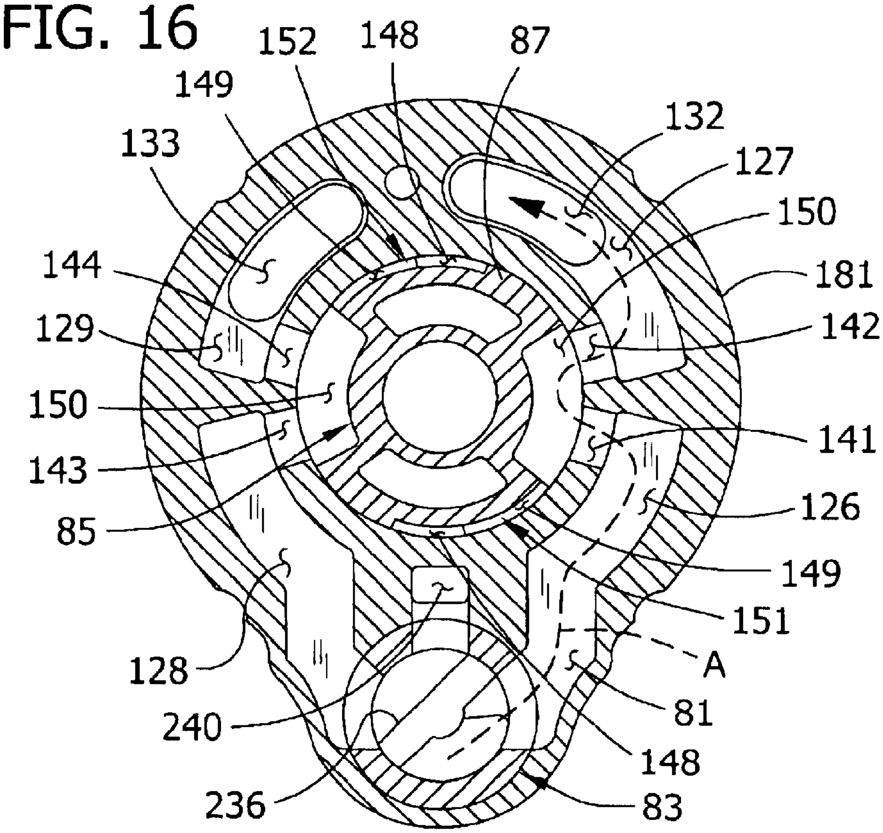
FIG. 16 is a section like FIG. 10, but illustrating the torque selector in the position of FIG. 15.

In the final position (FIGS. 15 and 16), the arrow indicator 246 indicates a setting of 4, where only the third groove 150 of the first set 151 is aligned with the first hole 141 and with the second hole 142. Thus, the cross-sectional area of only the third groove controls how much air moves through the first passage 117, controlling tool power at a maximum allowable torque in the forward rotational direction. It is contemplated that the torque selector 85 could be formed with a fewer or greater number of grooves without departing from the scope of the present invention. The third groove 150 of the second set 152 similarly controls tool power at a maximum allowable torque in the reverse rotational direction.

From the second channel 127, the air passes to the motor 49 through the first motor opening 132 for forward operation. Likewise, from the fourth channel 129, the air passes to the motor 49 through the second motor opening 133 for reverse operation.

The rotor 108 is rotatable within the passaging sleeve 106 (FIGS. 3 and 24). The rotor 108 is of unitary cylindrical construction with a support shaft 271 extending from the rear end of the rotor and a splined shaft 273 extending from the front end of the rotor. The splined shaft 273 has a splined portion 275 and a smooth portion 277. The smooth portion 277 fits within a first ball bearing 279 mounted within the second end plate 114, while the splined portion 275 extends beyond the second end plate and engages the Maurer Mechanism 100. The splined portion 275 of the splined shaft 273 fits within a grooved hole 281 of the Maurer Mechanism 100 which fits within the Maurer Mechanism casing 45 (FIG. 3). The Maurer Mechanism 100 translates the high-speed rotational energy of the rotor 108 into discrete, high-impact moments on the output shaft 57. This allows the user to hold the tool 41 while the tool delivers discrete impacts of great force to the output shaft 57. The Maurer Mechanism 100 is well known to those skilled in the art, so details of its construction and operation will not be included here.

The support shaft 271 fits within a second ball bearing 283 mounted within the first end plate 112 (FIG. 3). The splined shaft 273 and the support shaft 271 extend generally along a cylindrical axis B of the rotor 108, and the two sets of ball bearings 279,283 allow the rotor to rotate freely within the passaging sleeve 106. The first end plate 112 may include a pressure relief hole 284 to relieve air pressure adjacent the bearing 283. The axis B of the rotor 108 is located eccentrically with respect to the central axis of the passaging sleeve 106 and has a plurality of longitudinal channels 285 that receive the vanes 110 (FIG. 24). The vanes 110 are formed from lightweight material and fit loosely within the channels 285, so that the end plates 112,114 and passaging sleeve 106 limit movement of the vanes 110 longitudinally of the tool within the air motor 49. The vanes 110 extend radially outwardly from the rotor 108 when it rotates, to touch the inside of the passaging sleeve 106. Adjacent vanes 110 create multiple cavities 287 within the motor 49 for receiving compressed air as the rotor 108 rotates. Each cavity 287 is defined by a leading vane 110 and a trailing vane, the leading vane leading the adjacent trailing vane as the rotor 108 rotates. As the cavities 287 pass before an inlet port 293, compressed air pushes against the leading vane 110, causing the rotor 108 to rotate.

As air travels through the air motor 49, the rotor 108 turns, causing the cavities 287 to move through three stages: a power stage, an exhaust stage and a recovery stage (FIG. 24). Air moves from the torque selector 85 into an intake manifold 295. The pressurized air is then forced through the inlet port 293 formed in the intake manifold 295, allowing air to move into the cavity 287 between the rotor 108 and the passaging sleeve 106. This begins the power stage. As the pressurized air pushes against the leading vane 110, the force exerted on the vane causes the rotor 108 to move in the direction indicated by arrow F. As the volume of air expands in the cavity 287, the rotor 108 rotates, increasing the volume of the space between the vanes 110. The vanes continue to move outward in their channels 285, preserving a seal between the vanes and the passaging sleeve 106.

At the end of the power stage, as the volume of the cavity 287 is increasing toward its maximum amount, the leading vane 110 passes a set of early stage exhaust ports 297 in the passaging sleeve 106 and support sleeve 104 (FIGS. 24–26). These ports 297 mark the transition between the power stage and the exhaust stage, allowing expanding air to escape from inside the air motor 49 to an area of lower pressure in interstitial spaces 299 between the air motor and the housing 43. Air leaving these ports 297 is exhausted from the tool 41, as discussed below. During an early portion of the exhaust stage, the volume of the cavity 287 is larger than at any other time in the cycle, expanding to a maximum volume and then beginning to decrease as the cavity moves past the bottom of the motor 49. As the trailing vane 110 passes the early stage exhaust ports 297, some air remains within the air motor 49 ahead of the trailing vane. As the rotor 108 continues turning, the volume of the cavity 287 decreases, increasing the air pressure within the cavity. Compressing this air creates backpressure within the motor 49, robbing the spinning rotor 108 of energy, slowing the rotation of the rotor. To alleviate this backpressure buildup within the motor 49, the end of the exhaust stoke includes a late stage exhaust port 301 which allows the remaining air to escape from the air motor 49 into an exhaust manifold 303. This exhaust air is then routed out of the tool 41 as discussed below. Passing the late stage exhaust port 301 marks the transition to the third stage of the motor 49, the recovery stage, where the volume of the cavity 287 is at its smallest. This stage returns the air vane 110 to the beginning of the power stage so that the motor 49 may repeat its cycle.

As the rotor 108 rotates, the vanes 110 continually move radially inward and radially outward in their channels 285, conforming to the passaging sleeve 106 (FIG. 24). The rotation of the rotor 108 forces the vanes 110 radially outward as it rotates, but the vanes may be initially reluctant to move radially outward before the rotor has begun turning at a sufficient rate to push them outward as the rotor turns. This problem may be exacerbated by the presence of required lubricants within the air motor 49. Without the vanes 110 extended from their channels 98, air may simply pass through the air motor 49 to the early stage exhaust valve 297 without turning the rotor 108 as desired. To counteract this effect, the first end plate 112 (FIGS. 17–19) and the second end plate 114 (FIGS. 28 and 29) each include a vane intake channel 305. Some pressurized air in the intake manifold 295 passes through these vane intake channels 305 at either end of the air motor 49. The air moves within the channel 305 behind the vanes 110 to push the vanes out of the channels 285 so that air passing through the motor 49 can press against the extended vanes. The vane intake channels 305 deliver air to each vane 110 as it moves through most of the power stage. The intake channel 305 ends once the vane 110 nears full extension from the channel 285. After the vane 110 begins moving back inward toward the axis of the rotor 108, the air behind the vane must escape, so vane outlet channels 307 (generally, exhaust air passageways) are formed on the first end plate 112 and the second end plate 114. These allow the air behind the vane 110 to move through the channel 307 and into the exhaust manifold 303. The air may then exit the motor 49 in the same manner as the air exiting the late stage exhaust port 301.

Returning to the exhaust air exiting the early stage exhaust port 297, the air then passes through a pair of orifices (not shown) in the housing 43 which lead to the air exhaust 91 in the grip 71 (FIG. 3). Exhaust air exiting the late-stage exhaust port 301 or one of two vane outlet channels 307 and entering the exhaust manifold 303 exits the tool 41 by a different path (FIG. 4). This path guides the air through the fourth and third channels 129, 128 back toward the rotation selector valve 83. The exhaust air passes through the top port 240 to two exhaust air passages 309 of the first end plate (FIGS. 4, 17, 19) which direct the exhaust air to interstitial spaces 299 between the support sleeve 104 and first end plate 112 and the housing 43 (FIG. 4). The remaining exhaust air then travels through these spaces 299 to the orifices and out the air exhaust 91 as with the other exhaust air.

Operating in the reverse direction, the tool 41 works substantially the same. Air enters the tool 41 through the same air inlet 77. The rotation selector valve 83 diverts the air to the third channel 128, through the torque selector 85 and the fourth channel 129 as described above with respect to the torque selector. The air is directed to the exhaust manifold 303, through the late-stage exhaust port 301 and enters the air motor 49 where it reacts on the opposite side of the vanes 110, thereby applying force to the rotor 108 in the opposite direction. The early-stage exhaust port 297 operates substantially the same as in the forward direction. The vane intake channel 305 and vane outlet channel 307 operate as before, except that they allow air to flow in opposite directions. Exhaust air also exits through the inlet port 245 and is guided through the second and first channels 127, 126, through the top port 240 to the two exhaust air passages 309.

The design of the current invention is advantageous in that it includes plastic components, such as the housing 43 and end cover 59, to reduce the weight and cost of the tool. The design is further advantageous in that the air inlet passage 81, which delivers pressurized air from the inlet 77 to the motor 49 and which includes the torque selector 85, inhibits premature or unexpected escape of pressurized air. Since the pressurized air is not in direct contact with flexible plastic components, the air is inhibited from bending the plastic components and from thereby escaping from the air inlet passage. Accordingly, the design is further advantageous in that pressurized air is efficiently used.

In view of the above, it will be seen that the several objects of the invention are achieved and other advantageous results attained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A pneumatic rotary tool comprising:

a housing formed of a plastic material, the housing including a motor receptacle having a front end and an open rear end, and end cover formed separately from the motor receptacle and located at the rear end of the motor receptacle;

an air motor disposed within the motor receptacle of the housing;

an air inlet supported by the housing and constructed for connection to a source of pressurized air;

an air inlet passage extending from the air inlet to the motor for delivering pressurized air to the motor to power the motor to drive an output shaft;

an air exhaust supported by the housing;

an air exhaust passage extending from the motor to the air exhaust for exhausting air from the motor to outside the tool housing;

said air motor comprising a cylindrical support sleeve, the support sleeve having at least one open end, a rotor rotatable within said support sleeve, an end plate at said open end of the support sleeve substantially closing said open end, the end plate having air passaging formed therein, at least part of said air passaging defining a portion of the air inlet passage;

and a torque selector at least partially received in the end plate and including a portion disposed in the air passaging defined in the end plate and at least partially blocking the flow of air in the air passaging except through said portion of the torque selector.

2. A pneumatic rotary tool as set forth in claim 1 wherein the support sleeve and the end plate are made of metal.

3. A pneumatic rotary tool as set forth in claim 1 wherein the end plate has an inlet opening therein for receiving air from the air inlet passage into the air passaging of the end plate.

4. A pneumatic rotary tool as set forth in claim 3 wherein the air passaging of the end plate includes:

a first channel adapted for fluid communication with the inlet opening;

a torque selector receptacle receiving said portion of the torque selector therein, the first channel being in fluid communication with the torque selector receptacle;

a second channel in fluid communication with the torque selector receptacle; and a first motor opening in fluid communication with the second channel and with the air motor.

5. A pneumatic rotary tool as set forth in claim 4 wherein the end plate has a front face directed toward the air motor and a rear face opposite the front face, the first and second channels being formed in the rear face of the end plate and opening rearwardly of the end plate.

6. A pneumatic rotary tool as set forth in claim 5 further comprising a gasket plate at least partially made of metal and located between the end cover of the housing and the end plate, the gasket plate sealably engaging the end plate and closing the rearward opening of the first and second channels.

7. A pneumatic rotary tool as set forth in claim 6 wherein the gasket plate comprises a metal plate having a plastic overmolding.

8. A pneumatic rotary tool as set forth in claim 4 wherein the torque selector receptacle has a generally cylindrical inner surface and the torque selector has a generally cylindrical outer surface in face to face relation with the inner surface of the torque receptacle, the torque selector being pivotable about an axis of rotation of the torque selector in the torque selector receptacle.

9. A pneumatic rotary tool as set forth in claim 8 wherein the torque selector receptacle has a first hole extending through the receptacle from the inner surface to the first channel for fluid communication of the receptacle and a second hole extending through the receptacle from the inner surface to the second channel for fluid communication with the second channel.

10. A pneumatic rotary tool as set forth in claim 9 wherein the torque selector has at least two generally circumferentially extending grooves in the outer surface, the grooves being selectively disposed for registration with the first and second holes in the torque selector receptacle to permit fluid communication from the first channel to the second channel by way of the torque selector.

11. A pneumatic rotary tool as set forth in claim 10 wherein the grooves are of different sizes for controlling the pressure of the air passing through the torque selector from the first channel to the second channel thereby to control the torque of the air motor.

12. A pneumatic rotary tool as set forth in claim 11 wherein there are three grooves in fluid communication with each other, each groove having a different cross sectional area.

13. A pneumatic rotary tool as set forth in claim 10 wherein the air passaging further includes:

a third channel adapted for fluid communication with the inlet opening and for fluid communication with the torque selector receptacle;

a fourth channel in fluid communication with the torque selector receptacle;

a second motor opening in fluid communication with the second channel and with the air motor; and a rotation direction selector valve supported by the housing and disposed in the air passage and blocking communication of the inlet opening with the first channel or the third channel except through the valve, the selector valve being movable between a forward rotation position in which the first channel is in fluid communication with the inlet opening and the third channel is blocked from fluid communication with the inlet opening and a reverse rotation position in which the third channel is in fluid communication with the inlet opening and the first channel is blocked from fluid communication with the inlet opening.

14. A pneumatic rotary tool as set forth in claim 13 wherein the third and fourth channels define part of the exit air passage in the forward rotation position of the rotation direction selector valve and the first and second channels define part of the exit air passage in the reverse rotation position of the valve.

15. A pneumatic rotary tool as set forth in claim 14 wherein the end plate has an exhaust air passageway adapted to receive exhaust air from the air motor and to exhaust it from the end plate, the exhaust air passageway being in fluid communication with the third channel and blocked by the rotation direction selector valve from communication with the first channel in the forward rotation position of the valve, the exhaust air passageway being in fluid communication with the first channel and blocked by the rotation direction selector valve from communication with the third channel in the reverse rotation position of the valve.

16. A pneumatic rotary tool as set forth in claim 1 wherein the torque selector has at least two generally circumferentially extending grooves, the grooves being selectively disposed for registration with the second end plate.

17. A pneumatic rotary tool as set forth in claim 1 wherein the end plate comprises an exhaust air passageway defining a portion of the exhaust air passage for receiving at least some of the air exhausted from the air motor and delivering the exhaust air from the end plate.

18. A pneumatic rotary tool as set forth in claim 1 wherein the end plate constitutes a first end plate, the motor further comprising a second end plate at a second open end of the support sleeve for substantially closing the second open end.

19. A pneumatic rotary tool comprising:

a housing made of plastic;

an air motor disposed within the housing;

an air inlet supported by the housing and constructed for connection to a source of pressurized air;

an air inlet passage extending from the air inlet to the motor for delivering pressurized air to the motor to power the motor to drive an output shaft;

a torque selector at least partially received in the motor and defining a portion of the air inlet passage;

an air exhaust supported by the housing;

an air exhaust passage extending from the motor to the air exhaust for exhausting air from the motor to outside the tool housing; and wherein the portion of the air inlet passage defined by the torque selector is made of metal and is not made of plastic.

20. A pneumatic rotary tool as set forth in claim 19 wherein said air motor further comprises a cylindrical support sleeve made of metal, the support sleeve having at least one open end, a rotor rotatable within said support sleeve, and an end plate made of metal and being disposed at said open end of the support sleeve substantially closing said open end, the end plate having an air passage segment formed therein defining a portion of the air inlet passage.

21. A pneumatic rotary tool as set forth in claim 20 wherein the torque selector is at least partially received in the end plate and including a portion disposed in the air passage segment defined in the end plate and blocking the flow of air in the air passage segment except through said portion of the torque selector.

22. A pneumatic rotary tool as set forth in claim 20 wherein the end plate is formed separately from the support sleeve, the tool further comprising at least one fastener for use in connecting the end plate to the support sleeve.

23. A pneumatic rotary tool as set forth in claim 22 wherein the housing includes an end cover located at a rearward end of the housing generally adjacent to the end plate, the end cover urging the end plate toward the support sleeve.

24. A pneumatic rotary tool as set forth in claim 23 wherein the end cover is made of a first material and the end plate is made of a second material, the second material being more rigid than the first material.

25. A pneumatic rotary tool as set forth in claim 24 wherein the first material is plastic or polymer and the second material is metal.

* * * * *